Jan. 24, 1933. P. P. SANDFORD 1,895,173
REFLECTING DEVICE
Original Filed Dec. 3, 1924

Inventor,
Philip P. Sandford.
By His Attorneys
Baldwin & Wight.

Patented Jan. 24, 1933

1,895,173

UNITED STATES PATENT OFFICE

PHILIP PUREFOY SANDFORD, OF TEDDINGTON, ENGLAND, ASSIGNOR, BY MESNE ASSIGNMENTS, TO JONATHAN C. STIMSON, OF ST. LOUIS, MISSOURI

REFLECTING DEVICE

Original application filed December 3, 1924, Serial No. 753,744, and in Great Britain December 3, 1923. Divided and this application filed August 8, 1928. Serial No. 298,383.

This application is a division of my application for U. S. Patent filed December 3, 1924, No. 753,744.

This invention relates to reflecting devices, and more particularly to devices of the character having deflecting surfaces adapted to reflect light impinging thereon at varying angles approximate the light source. The device is adapted for various purposes, such as a reflecting unit for vehicles or for a letter, sign, or design suitable for use in advertisements, display, decoration, etc. Where the device is used to make up a letter, sign, or design, then the units are arranged along the stroke or strokes of the character.

Generally stated, in accordance with this invention, the reflecting device comprises a series of reflecting units arranged in contiguous relation and having reflecting surfaces adapted to reflect light impinging thereon at varying angles back approximate the light source; the reflector, however, has a transparent, spheric front face overlying and common to said units and through which the light passes. In accordance with one embodiment of this invention, the device is composed of a transparent, prismatic plate having a series of totally reflecting units on the back thereof, and this plate has a spheric front face overlying and common to these units.

In accordance with a particular embodiment described and illustrated, a number of tetrahedron may be suitably embodied in one reflector unit which is preferably mounted in a support or other mounting so as to exclude dust or moisture from its surface. In one construction especially suitable for a rear reflector on a bicycle the unit may be mounted in a metal or other cup having means for attachment to the mudguard of the cycle. Preferably also the unit or each glass element has a curved face so that the rays of light falling upon the reflector will be reflected back with a small deviation to the direction from which they strike the reflector, the deviation being such that they will be visible, for example, to the occupant of a vehicle at a distance of 100 yards.

The invention is illustrated in the accompanying drawing in which Figure 1 shows the letter A formed of a number of reflector units.

Figure 1:
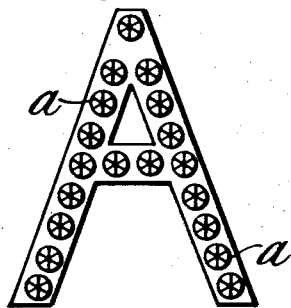
Figure 2:
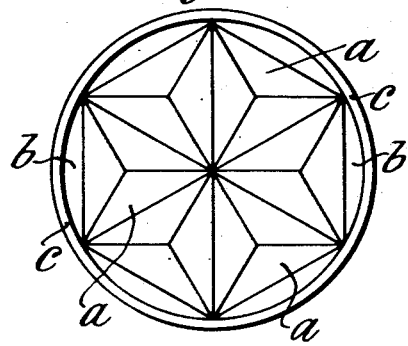
Figures 2 and 3 are an elevation and section of a reflector unit.
Figure 3:
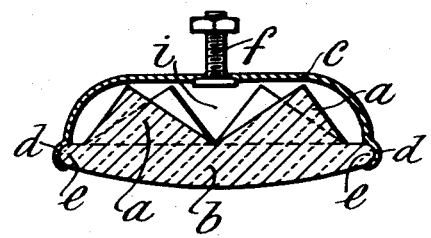

In the drawing $a$ $a$ are six right angled tetrahedra formed on the back of a convex lens $b$ and $c$ is a metal holder or casing which surrounds the periphery of the lens, the casing being channelled at $d$ to engage the rim $e$ of the lens in order to make a dust-tight enclosure. $f$ is a bolt on the casing for securing it to a board or other suitable substance.

Figure 4:
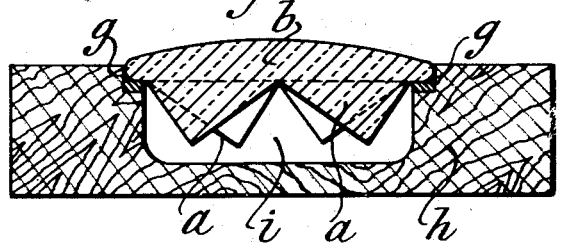
Figure 4 is a section of a modification.

Figure 4 shows the unit $a$ mounted in a recess $g$ in a wood or other support $h$.

It will be understood that rays of light incident on the face of the lens will be reflected back substantially towards the source from which they emanated, so that the convexity of the lens will cause a slight divergence in a reflective beam. This effect may also be obtained by slight errors or roughnesses in moulding the glass or metal or other surface.

It will be observed that at the back of the mounting or casing is an air space indicated at $i$ from which it is essential to exclude dust, since should there be contact between the surface of the glass and the mounting or case or if dust settles thereon, the refractive index would not remain constant and consequently the effect obtained would be spoilt.

What I claim is:—

1. A sign forming element comprising a glass body having a slightly curved front face and a plurality of right angled tetrahedra projecting from its rear face.

2. A sign forming element comprising a glass body having a slightly curved front face and a plurality of right angled tetrahedra projecting from its rear face, and a support backing embracing the edges of the body and enclosing the tetrahedra in spaced relation to form a dust excluding air pocket.

3. A sign forming element comprising a circular glass disc having one flat and one convex face, and a plurality of right angled tetrahedra projecting from the flat face.

4. A reflecting device of the character described, comprising, a series of reflecting units arranged in contiguous relation and having reflecting surfaces adapted to reflect light impinging thereon at varying angles back approximate the light source, the reflector having a transparent spheric front face overlying and common to said units and through which the light passes.

5. A reflecting device of the character described, comprising, a transparent prismatic plate having a series of totally reflecting units on the back thereof, the reflecting surfaces of which are adapted to reflect light impinging thereon at varying angles back approximate the light source, said plate having a spheric front face overlying and common to said units and through which the light passes.

In testimony that I claim the foregoing as my invention I have signed my name this 27th day of July 1928.

PHILIP PUREFOY SANDFORD.